United States Patent
Bouyer et al.

(10) Patent No.: US 10,577,709 B2
(45) Date of Patent: *Mar. 3, 2020

(54) METHOD FOR PRODUCING DENSE THIN FILMS BY ELECTROPHORESIS

(71) Applicant: I-TEN, Lyons (FR)

(72) Inventors: Frédéric Bouyer, Perrigny les Dijon (FR); Bruno Vuillemin, Darbonnay (FR); Fabien Gaben, Ecully (FR)

(73) Assignee: I-TEN, Lyons (FR)

( * ) Notice: Subject to any disclaimer, the term of this patent is extended or adjusted under 35 U.S.C. 154(b) by 368 days.

This patent is subject to a terminal disclaimer.

(21) Appl. No.: 14/355,148

(22) PCT Filed: Oct. 30, 2012

(86) PCT No.: PCT/FR2012/052504
§ 371 (c)(1),
(2) Date: Apr. 29, 2014

(87) PCT Pub. No.: WO2013/064776
PCT Pub. Date: May 10, 2013

(65) Prior Publication Data
US 2014/0339085 A1    Nov. 20, 2014

(30) Foreign Application Priority Data

Nov. 2, 2011  (FR) .................................. 11 59897

(51) Int. Cl.
*C25D 13/02* (2006.01)
*C25D 13/04* (2006.01)
(Continued)

(52) U.S. Cl.
CPC ............. *C25D 13/02* (2013.01); *C25D 13/00* (2013.01); *C25D 13/04* (2013.01); *C25D 13/22* (2013.01);
(Continued)

(58) Field of Classification Search
CPC ........ C25D 13/02; C25D 13/00; C25D 13/04; C25D 13/22; C25D 5/50; H01M 4/0457;
(Continued)

(56) References Cited

U.S. PATENT DOCUMENTS

2003/0102222 A1   6/2003  Zhou
2004/0259713 A1*  12/2004 Frey ................................ 501/33
(Continued)

FOREIGN PATENT DOCUMENTS

WO        00/69790 A2    11/2000

*Primary Examiner* — Xiuyu Tai
(74) *Attorney, Agent, or Firm* — Jordan IP Law, LLC; Todd A. Vaughn

(57) ABSTRACT

Process for deposition of a dense thin film comprising at least one material Px on a substrate, in which:
- (a) a colloidal suspension is procured containing nanoparticles of at least one material Px,
- (b) said substrate is immersed in said colloidal suspension, jointly with a counter electrode,
- (c) an electrical voltage is applied between said substrate and said counter electrode so as to obtain the electrophoretic deposition of a compact film comprising nanoparticles of said at least one material Px on said substrate,
- (d) said compact film is dried,
- (e) said film is mechanically consolidated,
- (f) thermal consolidation is carried out at a temperature $T_R$ that does not exceed 0.7 times (and preferably does not exceed 0.5 times) the melting or decomposition temperature (expressed in ° C.) of the material Px that melts at the lowest temperature, preferably at a temperature of between 160° C. and 600° C., and even more preferably at a temperature of between 160° C. and 400° C., (Continued)

knowing that steps (e) and (f) can be carried out simultaneously, or can be inverted.

22 Claims, 4 Drawing Sheets

(51) Int. Cl.

| | |
|---|---|
| *H01M 4/13* | (2010.01) |
| *C25D 13/22* | (2006.01) |
| *H01M 4/139* | (2010.01) |
| *H01M 4/04* | (2006.01) |
| *C25D 13/00* | (2006.01) |
| *H01M 4/505* | (2010.01) |
| *H01M 4/1391* | (2010.01) |
| *H01M 10/0525* | (2010.01) |
| *H01F 41/26* | (2006.01) |
| *C25D 5/50* | (2006.01) |
| *H01M 4/485* | (2010.01) |
| *H01M 4/131* | (2010.01) |
| *H01M 4/36* | (2006.01) |
| *H01M 10/0562* | (2010.01) |
| *H01M 4/02* | (2006.01) |

(52) U.S. Cl.
CPC ........ *H01M 4/0457* (2013.01); *H01M 4/0471* (2013.01); *H01M 4/13* (2013.01); *H01M 4/139* (2013.01); *C25D 5/50* (2013.01); *H01F 41/26* (2013.01); *H01M 4/043* (2013.01); *H01M 4/131* (2013.01); *H01M 4/1391* (2013.01); *H01M 4/364* (2013.01); *H01M 4/485* (2013.01); *H01M 4/505* (2013.01); *H01M 10/0525* (2013.01); *H01M 10/0562* (2013.01); *H01M 2004/021* (2013.01); *H01M 2300/002* (2013.01); *H01M 2300/0071* (2013.01)

(58) Field of Classification Search
CPC ............... H01M 4/13; H01M 4/139; H01M 2300/0071; H01M 4/043; H01M 4/131; H01M 4/1391; H01M 4/364; H01M 4/485; H01M 4/505; H01M 10/0525; H01M 10/0562; H01M 2004/021; H01M 2300/002; H01M 4/0471; H01F 41/26; Y02F 602/122; H01G 9/2031; Y02P 70/521; Y02E 10/542
See application file for complete search history.

(56) References Cited

U.S. PATENT DOCUMENTS

| | | | |
|---|---|---|---|
| 2009/0114275 A1* | 5/2009 | Zaban et al. | 136/256 |
| 2011/0045351 A1 | 2/2011 | Ramot | |
| 2011/0100532 A1* | 5/2011 | Lee et al. | 156/150 |
| 2011/0227000 A1 | 9/2011 | Ruoff | |
| 2011/0240112 A1* | 10/2011 | Ahn et al. | 136/256 |
| 2012/0073642 A1* | 3/2012 | Chen et al. | 136/256 |
| 2012/0211365 A1* | 8/2012 | Joung et al. | 204/473 |

* cited by examiner

METHOD FOR PRODUCING DENSE THIN FILMS BY ELECTROPHORESIS

FIELD OF THE INVENTION

This invention relates to the field of thin films, and especially the field of films for thin film electric or electronic devices, such as so-called printed electronics (transistor, resistors, circuits, diodes, capacitors, inductors, screens), batteries (and particularly lithium ion batteries) and photovoltaic cells.

STATE OF THE ART

There are many known techniques for making dense thin films. Vacuum deposition techniques are widely used for the fabrication of thin film electronic devices. They include various natures of techniques such as Physical Vapor Deposition (PVD), glow discharge deposition, Chemical Vapor Deposition (CVD), possibly plasma assisted, gas phase epitaxy. In general, vacuum deposition can be used to make excellent quality dense thin films with very good adherence, but the deposition rate remains low (typically of the order of 1 µm/h to 10 µm/h). Vacuum deposition can be complex and expensive due to the vacuum technique used with it. The raw material is often expensive due to its high purity and transformation in the form of targets, and is only partly used because there can be a deposit on the reactor walls and on the masks thus requiring cleaning or stripping operations that can make a significant contribution to the operating cost of the process. Furthermore, these depositions or stripping techniques frequently involve the use of highly corrosive gases. Finally, in some cases, vacuum deposition techniques require high temperatures that cannot be resisted by all types of substrates.

Vacuum deposition techniques can be used in an extremely wide application field that is not limited to microelectronic fields. For example, deposition of thin film silicon-based photovoltaic cells is done by glow discharge, and the PVD deposition is also the most frequently used technology at the present time for fabrication of thin film micro-batteries.

PVD techniques make use of usually lower temperatures; in general they lead to good quality films. However, due to the difference in the evaporation rate between the different elements, it is difficult to deposit complex compositions (or alloys) using such techniques and to control the stoechiometry of the deposit. PVD is perfectly suitable for making very thin films, but as soon as an attempt is made to increase the thickness of the deposit (for example for thicknesses of more than 5 µm), columnar growth occurs and the deposition time becomes long.

Another technology for making thin films is sol-gel deposition, in which an inorganic polymeric network is deposited on the surface of a substrate, formed after hydrolysis, polymerization and condensation steps from appropriate precursors. The sol-gel transition appears during evaporation of the solvent that accelerates reaction processes on the surface. This technique can be used to make compact and very thin deposits (for example see patent application WO2010/076428, Centre National de la Recherche Scientifique) of the order of about 100 nanometers thick. Successive steps should be performed to increase the thickness of the deposit without inducing risks of cracks or crazing occurring. Consequently, this technique creates industrial productivity problems as soon as an attempt is made to increase the thickness of the deposit.

Plasma thermal spray techniques are also known that are adapted to the fabrication of relatively thick deposits several hundred microns thick, but they are not very precise and cannot be used to obtain sufficiently homogeneous and controlled thickness of thin films for use in electronics, optics and electrotechnics.

Ink printing techniques are also used, and are used particularly for the fabrication of Li-ion batteries (see the book "*Advances in Lithium-Ion Batteries*" (published by W. van Schalkwijk and B. Scrosati) in 2002 (Kluever Academic/Plenum Publishers). They can be used to make deposits with typical thicknesses between 40 and 400 µm. Depending on the required composition, inks (or paste) deposited to form the electrodes of these batteries contain particles of different materials, but must also contain organic binders and solvents that are evaporated during the electrode drying step. If the films deposited in this manner have to have electrical conductivity, a calendering step is applied to improve the quality of electrical contacts between particles and to compact the deposits. After this compression step, active particles of the electrodes typically occupy about 60% of the volume of the deposit, which means that there is usually 40% porosity between particles. These pores may be filled with an electrolyte for some applications, for example for Li-ion type batteries.

Viscous pastes are also used to make dense pore-free deposits. This technique makes use of particles mixed with binders, organic plasticizers and other solvents. After deposition of the paste, a drying step is performed to evaporate the solvents, followed by a burning step to calcinate and evacuate organic compounds that were used to make the paste. Such a process generates large quantities of organic compound vapors which creates problems related to management of releases and safety and environment constraints, but as a result, raw material is also lost and cannot be reused in the industrial system. Once all these compounds have been evaporated and burned, a porous deposit is obtained that has to be compacted to fill in the cavities and defects left free after the binders have been burned. Compaction will be easier if the dry extract of inks is high and the size of the particles is large (more than one micrometer). This large quantity of dry extract imposes a high viscosity so that it becomes impossible to make dense thin films less than about 20 µm thick. These deposits are then sintered at high temperature to obtain dense films.

The inking techniques described above can be used to make relatively thin deposits. However, a fluid ink is essential if thin deposits (between 1 and 5 micrometers thick) are to be obtained. The fluidity of inks depends on their dry extracts, particle sizes and the nature of the solvent and any organic compounds dissolved in this ink. In order to make thin film deposits, the dry extract has to be reduced and excessively small particle sizes are impossible (larger than about a hundred nanometers). On the other hand, this increase in the solvent quantity increases the risk of forming cracks, cavities and clusters in the film during the drying phases. The deposits then become very difficult to compact. Final compaction of the deposit is obtained by evaporation of the solvent contained in the ink. This drying step is difficult to control because regions with lower densities and locally lower porosity will dry faster than areas with higher densities. Capillary effects induced by these local differences in drying will cause zones with higher densities that are still impregnated to group together. The only way to consolidate these deposits is compaction under very high pressures (with the required pressure increasing as the particle size reduces) and/or sintering at high temperatures close to the melting temperature of the material forming the particles. Not all substrates resist such temperatures, and also the thickness of the deposit cannot be precisely controlled using the current liquid phase deposition techniques disclosed above.

Thin films were also deposited by electrophoresis; this was disclosed especially for films to be used in electrochemical devices and especially in batteries. For example, U.S. Pat. No. 7,662,265 (Massachusetts Institute of Technology) discloses the fabrication of thin film electrochemical devices by electrophoresis in which one of the electrodes (anode or cathode) and the solid electrolyte are obtained simultaneously, the other electrode having already been formed by electrophoretic deposition, the solid electrolytes being polymer electrolytes. U.S. Pat. No. 6,887,361 (University of California) discloses a process to form a ceramic coating on an electrochemical device substrate in the solid state. Electrophoretic deposition is made of a suspension of ceramic particles in isopropylic alcohol followed by drying and sintering. The process is essentially applicable to Solid Oxide Fuel Cells (SOFC). Patent applications US 2007/184345, WO 2007/061928, US 2008/286651 and WO 2010/011569 (Infinite Power Solutions) describe electrochemical devices comprising a cathode film deposited by electrophoresis from a micron-size $LiCoO_2$ powder; however, there are cavities in this film that must be consolidated by high temperature sintering.

U.S. Pat. No. 7,790,967 (3G Solar Ltd) describes the electrophoretic deposition of a nanoporous $TiO_2$ electrode from a suspension of $TiO_2$ nanoparticles. The electrode thickness is of the order of 10 μm after consolidation of the wet deposit.

Some documents describe the use of electrophoresis for making some parts of thin film batteries; in these documents, electrophoresis also leads to porous films. Patent JP 4501247 (DENSO) discloses a process for fabrication of an electrode by electrophoresis. Patent application JP 2002-042792 (DENSO) discloses a process for deposition of a solid electrolyte on a battery electrode, the deposition being made by electrophoresis; no consolidation is made after the deposition. The electrolytes considered are essentially polymer electrolytes and lithium iodide. However, these films are all porous.

Publication "Electrophoretic deposition of $Ba_{0.77}Ca_{0.23}TiO_3$ nanopowders" by E. Antonelli and al., published in Journal of Materials Processing Technology 203 (2008), p. 526-531, describes an electrophoresis deposition process for nanometric powders of the given compound to form thick films. Dense films are obtained by sintering the electrophoretic films at 1300° C., and this is why the film was deposited on platinum sheets that are inert at this temperature. This sintering temperature was measured on a solid material and was used to sinter the deposit.

The problem that this invention attempts to solve is to propose a process for deposition of dense and pore-free thin films on substrates that do not resist very high temperatures, to be able to use a wide range of chemical compositions, and that does not involve any high temperature heat treatment incompatible with many industrial situations (for example deposition of a metal with a low melting point such as aluminum on a film; risk of interdiffusion at interfaces; undesirable annealing of a film contained in the substrate; risk of phase transformation).

Purposes Of The Invention

A first purpose of this invention is a process for the fabrication of dense thin films that have excellent geometric precision, particularly a precisely-controlled thickness and a very small number of defects, using a process providing a high deposition rate with low investment and operating costs.

Another purpose of the invention is to fabricate these thin films using a process that is easily implemented industrially and that causes little pollution.

Yet another purpose of the invention is to disclose a very simple process for making thin films with various chemical compositions.

The inventors found that electrophoresis of stable colloidal suspensions of nanoparticles makes it possible to deposit thin films with a wide range of chemical compositions and that these films can be consolidated by heat treatment at relatively low temperature.

These objectives are achieved by means of a process for deposition of a dense thin film comprising at least one material Px on a substrate, in which:

(a) a colloidal suspension is provided containing nanoparticles of at least one material Px, (b) said substrate is immersed in said colloidal suspension, together with a counter electrode, (c) an electrical voltage is applied between said substrate and said counter electrode so as to obtain the electrophoretic deposition of a compact film comprising nanoparticles of said at least one material Px on said substrate, (d) said compact film is dried, (e) optionally, said film is mechanically consolidated, (f) thermal consolidation is carried out at a temperature $T_R$ that does not exceed 0.7 times (and preferably does not exceed 0.5 times) the melting temperature (expressed in ° C.) of the material Px that melts at the lowest temperature, preferably at a temperature of between 160° C. and 600° C., and even more preferably at a temperature of between 160° C. and 400° C., knowing that steps (e) and (f) can be carried out simultaneously, or can be inverted.

In the particular mode according to the invention in which steps (e) and (f) are inverted, the minimum temperature $T_R$ of the thermal consolidation is much higher than 160° C.

Said colloidal solution may comprise nanoparticles of several different materials (called $Px_1$, $Px_2$, etc.). It may also comprise particles of at least one material Mx, said particles possibly but not necessarily being nanoparticles. Preferably, the diameter $D_{50}$ of said nanoparticles of at least one of the materials Px (and preferably all materials Px) is less than 100 nm, and preferably less than 30 nm and even more preferably less than 10 nm. The use of such small nanoparticles can give a high density after consolidation. This density advantageously reaches 80%, and preferably 90%, and even more preferably 95% of the theoretical density of the solid substance.

In one particularly advantageous embodiment, the process and particularly the consolidation steps are carried out such that the dense thin film obtained has a porosity of less than 20%, preferably less than 10% and even more preferably less than 5%.

The mechanical consolidation step is very advantageous for the process according to the invention. It may precede the thermal consolidation step, or it may be done at the same time as the thermal consolidation step, or it may even be done after it. The inventors have found that thin films can be thermally consolidated at a lower temperature when using this mechanical consolidation step, particularly when the thin films have been obtained from colloidal suspensions of nanoparticles. Moreover, this is why approximately spherical or cube-shaped particles are preferred; this represents a variant of this embodiment. According to the invention, mechanical consolidation can for example be carried out by making a pass between two rollers, by pressing, in one or several steps.

Thermal consolidation takes place at a relatively low temperature ($T_R$) (but high enough so that consolidation takes place), that depends on the melting point of the material, the size of the nanoparticles and the intensity of the mechanical consolidation. Advantageously, $T_R$ does not exceed 600° C., and preferably does not exceed 500° C. or even 400° C. Thermal consolidation is advantageously done under a vacuum in order to minimize surface pollution of the deposited particles, or even under an inert gas.

Another purpose of the invention is to obtain highly compact films after the deposition by electrophoresis, free particularly of cavities, cracks and clusters in order to facilitate consolidation at low temperature. Good stability of the colloidal suspension is an essential element of the process to achieve this.

Preferably, the zeta potential of the colloidal suspension is adjusted to a value of more than 60 mV, in order to obtain a stable suspension that does not form clusters of particles that could cause defects in deposited films. This suspension can contain a steric or preferably electrostatic stabilizer.

In one particular embodiment of the invention, the colloidal suspensions do not contain any steric and/or electrostatic stabilizer. These suspensions are obtained for dry extracts of between 2 and 20 g/L, preferably between 3 and 10 g/L, and more particularly of the order of 4 g/L. In these suspensions, the particle size is also preferably smaller than 100 nm and even more preferably smaller than 50 nm. In this case, the Zeta potential of the suspension is usually less than 40 mV, and more particularly is between 25 and 40 mV.

The electrophoretic deposition of nanoparticles can be facilitated by means of a step to deposit a compound designed to reduce the Zeta potential on conducting bands of the substrate prior to the deposition of Px particles.

Another purpose of the invention is the deposition of thin films with a very wide variety of chemical compositions that can associate several phases in order to increase functions of the deposits. This purpose is achieved through the use of the electrophoresis technique that makes it easy to deposit films using suspensions of particle mixes.

Another purpose of the invention is to be able to very precisely control deposited thicknesses (within a thickness range varying from a few hundred nanometers to a few tens or even about a hundred micrometers). More precisely, it is required to have a process that guarantees perfect uniformity of the thickness over the entire surface of the deposit, even on rough or non-flat substrates, and excellent reproducibility and repeatability at industrial scale.

In one advantageous embodiment, the thickness of the film after consolidation is less than 10 µm, preferably less than 5 µm and even more preferably less than 2 µm.

Yet another purpose is to achieve optimum economy of the raw material.

These different objectives are achieved through the use of electrophoresis and precise control of the deposition current throughout the deposition, knowing that deposition by electrophoresis will form on a sufficiently conducting substrate, and in particular will not form on an insulating stencil used to delimit the deposition zone.

Another purpose of the invention is use of the process according to the invention for fabrication of thin films and particularly dielectric, magnetic, ferroelectric, piezoelectric, optical films or electrode films in electronic, electrical or electrotechnical devices and preferably in devices selected in the group composed of batteries, capacitors, resistors, inductors, transistors, photovoltaic cells, diodes, wave guides.

Figure 3:
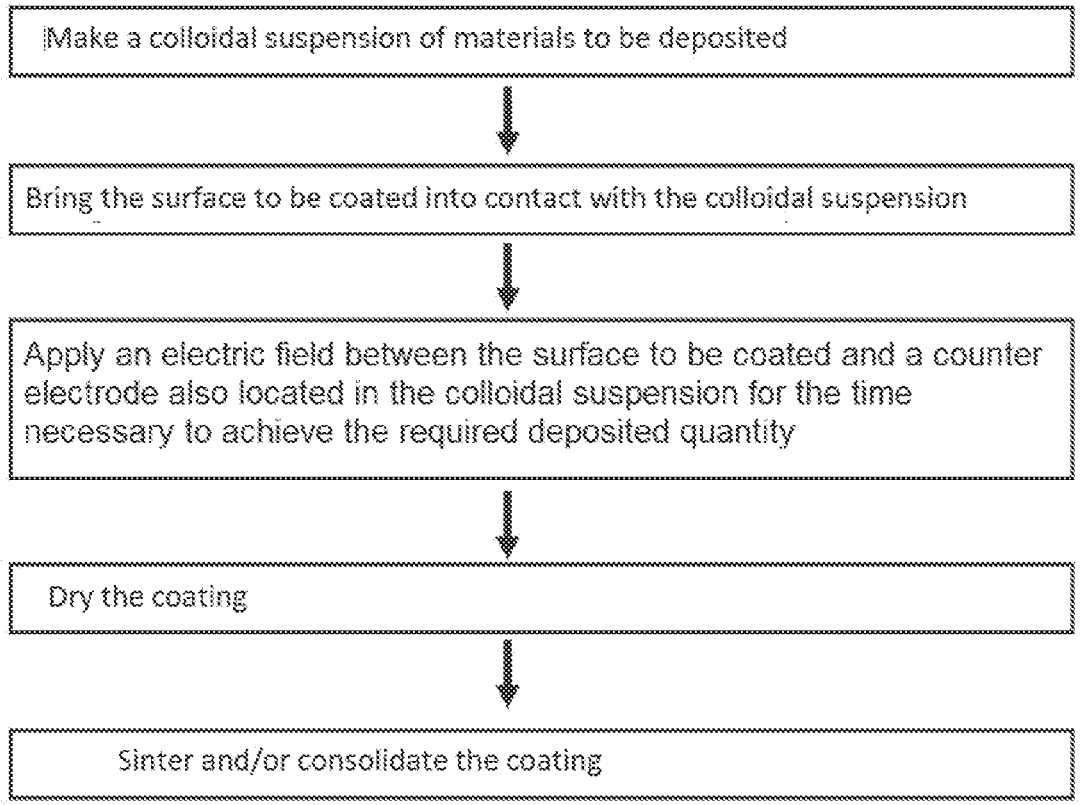
Figure 4:
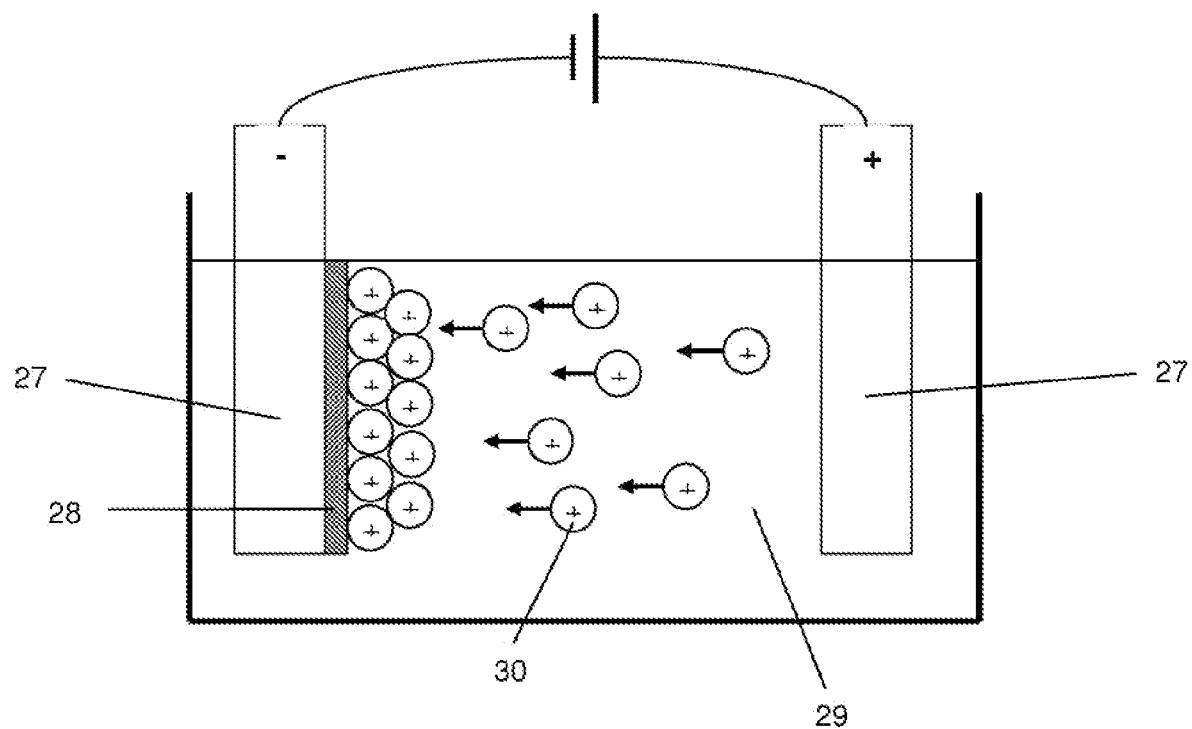

The diagram in FIG. 3 shows a typical embodiment of the process according to the invention:

FIG. 4 shows the operating principle of deposition by electrophoresis.

Figure 5:
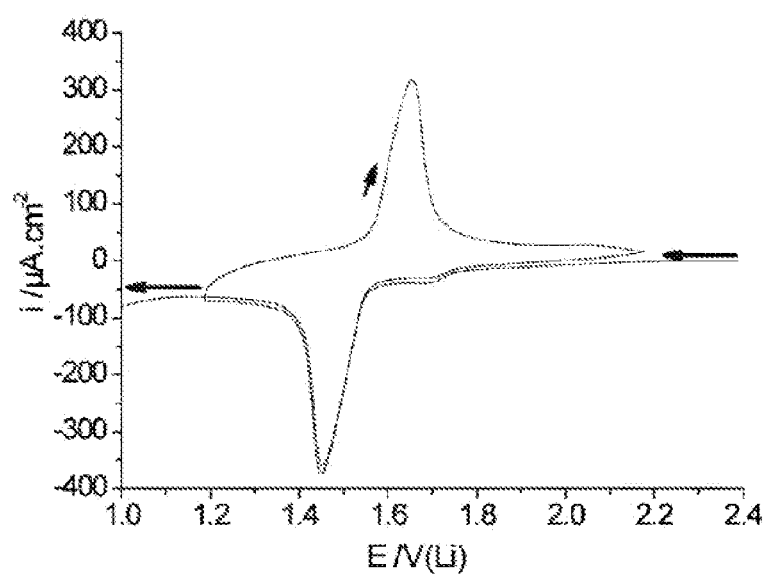

FIG. 5 shows the cyclic voltammetry curve at 0.1 V/sec of a $Li_4Ti_5O_{12}$ electrode obtained according to a particular embodiment of the invention (without addition of stabilizers).

DETAILED DESCRIPTION OF THE INVENTION

For the purposes of this invention, "electrophoretic deposition" or "deposition by electrophoresis" refers to a film deposited by a process for deposition of electrically charged particles previously put into suspension in a liquid medium onto a surface of a conducting substrate, displacement of particles towards the surface of the substrate being generated by application of an electric field between two electrodes placed in the suspension, one of the electrodes forming the conducting substrate on which the deposit is made, the other electrode (counter electrode) being located in the liquid phase. A compact deposit of particles thus forms on the substrate if the zeta potential has an appropriate value as will be explained below.

In the context of this document, the particle size refers to its largest dimension. Thus, a "nanoparticle" is a particle for which at least one of its dimensions is smaller than 100 nm. The "particle size" or "average particle size" of a powder or a set of particles is given by $D_{50}$.

The "zeta potential" of a suspension is defined as being the difference in potential between the heart of the solution and the shear plane of the particle. It is representative of the stability of a suspension. The shear plane (or hydrodynamic radius) corresponds to an imaginary sphere around the particle in which the solvent moves with the particle when the particles move in the solution. The theoretical basis and the determination of the zeta potential are known to the electrochemist who develops depositions by electrophoresis; it can be deduced from the electrophoretic mobility. There are several marketed techniques and devices for making a direct measurement of the zeta potential. When the dry extract is small, the zeta potential can be measured using a Zetasizer Nano ZS type equipment made by the Malvern Company. This equipment uses optical devices to measure particle displacement speeds as a function of the electric field applied to them. The solution also has to be highly diluted to enable the passage of light. When the quantity of dry extract is large, the zeta potential can be measured using acoustophoresis techniques, for example using a device called "acoustosizer" made by the Colloidal Dynamics Company. The particle speed is then measured by acoustic techniques.

"Dispersant" refers to a compound capable of stabilizing the colloidal suspension and particularly preventing particles from agglomerating.

The essential characteristics of the process according to the invention are an electrophoretic deposition of particles of a material Px from a colloidal suspension, drying of the film thus obtained and its mechanical and/or thermal consolidation. Such a process can significantly reduce the quantity of defects in films obtained in comparison with quantities obtained with known deposition processes, particularly large pores, cavities, crazing and clusters. The quality of deposited films is better when the suspension from which the deposition is made is sufficiently stable.

The process according to the invention can produce dense thin films with very variable thicknesses. Even if it is true that the high electrophoretic deposition rate can achieve thick film deposits under very good economic conditions, the process according to the invention gives good results especially for thin films, and particularly films less than 10 µm thick and even more preferably less than 5 µm thick, because it involves mechanical consolidation of nanopowders. It is thus easy to prepare dense thin films less than 1 µm or even 0.1 µm thick, or even thinner. The process according to the invention enables good control of the final thickness obtained, in other words it is both repeatable and reproducible. It does not require a very high investment cost compared with vacuum deposition techniques.

Figure 1:
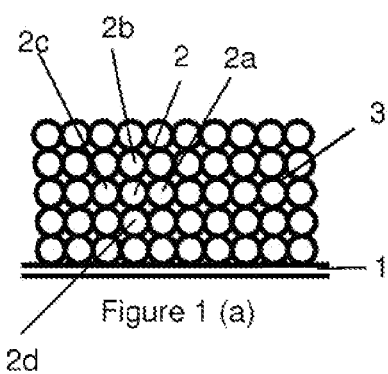
FIGS. 1(a), (b), (c) and (d) diagrammatically show films formed by stacking approximately isotropic shaped particles.
FIG. 1(e) shows a film deposited on a substrate using the PVD technique.
Figure 1:
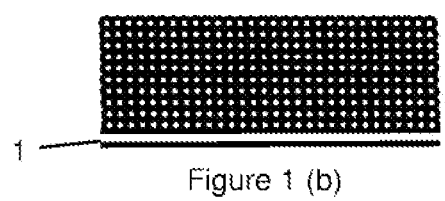
Figure 1:
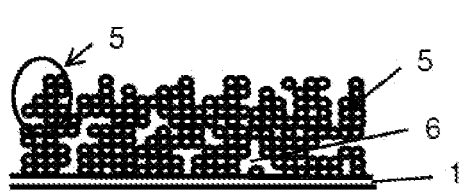
Figure 1:
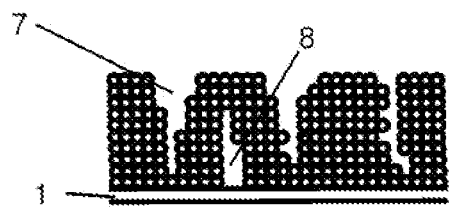
Figure 1:

FIGS. 1a to 1c show the differences between intra-cluster pores 3 between particles 2 that will be referred to in this document as "pores", and inter-cluster pores 6 between clusters 5 that will be referred to as "cavities" 6. FIG. 1(d) shows a deposit of particles with cracks that appeared after drying, that may be open (through) 7 or internal (not through) 8. La FIG. 1(e) shows a dense deposit 4 as was obtained using PVD type techniques; the porosity of these dense deposits is almost 0% because they are not formed by stacking of particles.

A compact deposit is a deposit without any cavities or cracks. On the other hand, it does have porosity in a ratio expressed as a percentage and calculated as follows:

Porosity [%]=[(density of the solid-state material−real density)/real density]×100 knowing that the "real density" is the density measured on the deposited film and the density of the solid-state material is the solid density of the deposited material, ignoring the presence of particles that create porosity when stacked.

The following describes each step in the process according to the invention.

Preparation of Suspensions

Deposition is preferably done from very stable colloidal suspensions so as to obtain a deposit with a perfectly uniform thickness with no roughness, few defects and as compact as possible after the electrophoretic deposition process. This minimizes the formation of pores, cavities and clusters that hinder consolidation of the deposit. The stability of suspensions depends on the size of the particles and the nature of the solvent used and the stabilizer if a stabilizer was used to stabilize the colloidal suspension.

The stability of suspensions can be expressed by their zeta potential. In the context of this invention, the suspension is considered to be stable when its zeta potential is more than 40 mV and very stable when it is more than 60 mV. On the other hand, particle clusters can develop when the zeta potential is less than 20 mV. Thus, depositions are preferably done from colloidal suspensions with a zeta potential of more than 40 mV, and even more preferably 60 mV (absolute value) to guarantee good compaction of the thin film.

Colloidal suspensions must contain nanometric sized particles to facilitate subsequent thermal consolidation of the deposit and to guarantee that thin film deposits can be made with very precise thicknesses and profiles (roughness). If several materials Px are present in said colloidal suspension, it is preferred that they are all present in the form of nanoparticles. The average size $D_{50}$ of these particles is preferably less than 100 nm, and more preferably less than 30 nm (especially in the case in which the suspension comprises particles of materials with high melting points). Thermal consolidation of the deposit with small particles is much facilitated if the deposit is compact. However, with a prior mechanical consolidation, the compactness of the deposit can be further increased and isolated crystallographic defects can be created inside particles and on their surface that will contribute to accelerating the thermal consolidation process at even lower temperatures.

Colloidal suspensions that will be used in electrophoresis comprise an electric insulating solvent that may be an organic solvent, or demineralized water, or a mix of solvents, and particles to be deposited; colloidal suspensions may also comprise one or several stabilizers. In a stable suspension, the particles do not agglomerate with each other to create clusters that could induce cavities, clusters and/or important defects in the deposit. Particles remain isolated in the suspension. Also in one embodiment of this invention, the stability of the suspension necessary to obtain a compact deposit is obtained through the addition of stabilizers. The stabilizer avoids flocculation of powders and the formation of clusters. It can act electrostatically or sterically. Electrostatic stabilization is based on electrostatic interactions between charges and is obtained by the distribution of charged species (ions) in the solution. Electrostatic stabilization is controlled by the ion concentration; consequently, it may depend on the pH. Steric stabilization uses non-ionic surfactant polymers or even proteins which, when added to the suspension, are absorbed at the surface of particles to cause repulsion by congestion of the inter-particle space. A combination of the two stabilization mechanisms is also possible. Electrostatic stabilization is preferred for the purposes of this invention because it is easy to implement, reversible, inexpensive and facilitates subsequent consolidation processes.

In one particular embodiment of the invention, colloidal suspensions of nanoparticles are made without any stabilizers. These suspensions were obtained for low quantities of dry extracts between 2 g/L and 20 g/L, preferably between 3 and 10 g/L, and more particularly for dry extracts of the order of 4 g/l, in an alcohol and/or ketone type organic solvent. These stable colloidal suspensions of particles without added stabilizers are especially preferred for this invention.

The Zeta potential of such suspensions is usually less than 40 mV, and more particularly between 25 and 40 mV. This could mean that such suspensions tend to be unstable, however the inventors have observed that the use of such suspensions for an electrophoretic deposition leads to very good quality deposited films.

Deposition voltages of less than 5 V must be preferred when the solvent used is water, because above 5 V, water can be electrolyzed causing gas production on electrodes making deposits porous and reducing their bond onto the substrate. Galvanic reactions in an aqueous medium also cause the formation of metal cations that can pollute deposits.

In one preferred embodiment, depositions are made in a solvented phase. It is thus possible to work at much higher voltages, thus increasing deposition rates.

According to the invention, nanoparticles used for making the dense thin film can be chosen from among a very large list and the choice will depend on the planned use.

For example, nanoparticles used to prepare cathode films in Li-ion type batteries can be chosen from among one or several of the following materials:

(i) $LiMn_2O_4$, $LiCoO_2$, $LiNiO_2$, $LiMn_{1.5}Ni_{0.5}O_4$, $LiMn_{1.5}Ni_{0.5-x}X_xO_4$ oxides (where x is selected from among Al, Fe, Cr, Co, Rh, Nd, other rare earths and in which $0<x<0.1$), $LiFeO_2$, $LiMn_{1/3}Ni_{1/3}Co_{1/3}O_4$;

(ii) $LiFePO_4$, $LiMnPO_4$, $LiCoPO_4$, $LiNiPO_4$, $Li_3V_2(PO_4)_3$ phosphates;

(iii) all lithium forms of the following chalcogenides: $V_2O_5$, $V_3O_8$, $TiS_2$, $TiO_yS_z$, $WO_yS_z$, $CuS$, $CuS_2$.

Nanoparticles used to prepare anode films in Li-ion type batteries can be chosen from among one or several of the following materials:

(i) tin oxinitrides (typical formula $SnO_xN_y$);

(ii) mixed silicon and tin oxinitrides (typical formula $Si_aSn_bO_yN_z$ where $a>0$, $b>0$, $a+b\leq2$, $0<y\leq4$. $0<z\leq3$) (also called SiTON), and particularly $SiSn_{0.87}O_{1.2}N_{1.72}$; and oxinitrides in the form $Si_aSn_bC_cO_yN_z$ where $a>0$, $b>0$, $a+b\leq2$, $0<c-10$, $0<y<24$. $0<z<17$; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, Pb;

(iii) $Si_xN_y$ type nitrides (particularly in which x=3 and y=4), $Sn_xN_y$ (particularly in which x=3 and y=4), $Zn_xN_y$ (particularly in which x=3 and y=4), $Li_{3-x}M_xN$ (where M=Co, Ni, Cu);

(iv) $SnO_2$, $Li_4Ti_5O_{12}$, $SnB_{0.6}P_{0.4}O_{2.9}$ oxides.

The anode or cathode can be made by adding nanoparticles of electron conducting materials to the materials mentioned above, and particularly graphite, and/or lithium ion conducting materials for example like the solid electrolyte materials described below.

Since the thin electrolyte film in a Li-ion battery must be a good ion conductor and an electrical insulator, the nanoparticles used are advantageously chosen from among one or several of the following materials Mx:

(i) lithium compounds based on lithium and phosphorus oxinitrides (called LiPON) in the form $Li_xPO_yN_z$ where x~2.8 and 2y+3z~7.8 and $0.16\leq z\leq0.4$, and particularly $Li_{2.9}PO_{3.3}N_{0.46}$, but also all variants in the form $Li_wPO_xN_yS_z$ where $2x+3y+2z=5=w$ and $3.2\leq x\leq3.8$, $0.13\leq y\leq0.4$, $0\leq z\leq0.2$, $2.9\leq w\leq3.3$ or in the form $Li_tP_xAl_yO_uN_vS_w$ where $5x+3y=5$, $2u+3v+2w=5+t$, $2.9\leq t\leq3.3$, $0.94\leq x\leq0.84$, $0.094\leq y\leq0.26$, $3.2\leq u\leq3.8$, $0.13\leq v\leq0.46$, $0\leq w\leq0.2$;

(ii) lithium compounds based on lithium, phosphorus and silicon oxinitrides (called LiSiPON), and particularly $Li_{1.9}Si_{0.28}P_{1.0}O_{1.1}N_{1.0}$;

(iii) lithium oxinitrides of the LiBON, LiBSO, LiSiPON, LiSON, thio-LiSiCON, LiPONB types (where B, P and S represent boron, phosphorus and sulfur respectively);

(iv) compounds $La_{0.51}L_{0.34}Ti_{2.94}$, $Li_{3.4}V_{0.4}Ge_{0.6}O_4$, $Li_2O-Nb_2O_5$, $LiAlGaSPO_4$;

(v) formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and/or $0<x<1$), $Li_{1+x+y}Al_xTi_{2-x}Si_yP_{3-y}O_{12}$ (where $0\leq x\leq1$ and $0\leq y\leq1$), $Li_{1+x+z}M_x(Ge_{1-y}Ti_y)_{2-x}Si_zP_{3-z}O_{12}$ (where $0\leq x\leq0.8$; $0\leq y\leq1.0$; $0\leq z\leq0.6$), and particularly formulations $4.9LiI-34.1Li_2O-61B_2O_3$, $0.30Li_2S-0.26B_2S_3-0.44LiI$, $60Li_2S-40SiS_2$, $0.02Li_3PO_4-0.98(Li_2S-SiS_2)$, $2(L_{1.4}Ti_2Si_{0.4}P_{2.6}O_{12})-AlPO_4$, $_{0.7}Li_2S-0.3P_2S_5$.

In this case (and in general in all deposits in which it is useful), polymer particles can be added and particularly polymers belonging to the polyimide, PVDF, PEO (polyethylene oxide), polymethacrylate, polysiloxane families. These polymers can be impregnated with lithium salts.

Nanoparticles used to deposit magnetic films may be chosen from among one or several of the following materials: NiFe alloys, for example with $Ni_{80}Fe_{20}$, FeCo, CoPt, FeCoNi alloys.

Nanoparticles used to deposit dielectric films may be chosen from among one or several of the following materials: $BaTiO_3$, SiN, polyimides, $CaCu_3Ti_4O_{12}$, $La_{(1-x)}Sr_xMnO_3$.

Once the required chemical composition (i.e. the nature of the powder or powder mixes) has been defined, the nanoparticles are put into solution in an appropriate liquid phase. A stabilizer can be added in order to obtain a suspension for which the zeta potential is preferably greater than 40 mV, and even more preferably greater than 60 mV. In some particular embodiments of the invention, there is no need to add stabilizers to obtain stable suspensions of nanoparticles, even if the zeta potential is less than 40 mV.

For example, the solvents used can be based on ketone, alcohol or a mix of the two.

Steric stabilizers that could be used include particularly polyethylene imine (PEI), polyacrylic acid (PAA), citric acid and nitrocellulose provided that they are soluble in the chosen organic solvent. Electrostatic stabilizations may be made by adding iodide, by adding acids or bases. The solution may be acidified or basified by the addition of traces of water and acids when the suspension is made in a solvented phase.

The electrical conductivity of the suspension may be controlled to obtain a large potential gradient between the two electrodes without any risk of dielectric breakdown. Preferably, the conductivity of the colloidal suspension is between 1 and 20 µS/cm. Small quantities of acids and strong bases can be added to control the conductivity of the suspension and charge particle surfaces.

It may be necessary to perform a powder grinding and/or dispersion step before the nanoparticles are put into suspension, to de-agglomerate the particles and possibly adjust their size (to obtain an average size smaller than 100 nm or even less than 30 nm) and reduce the size dispersion, so as to obtain a stable suspension with cluster-free nanometric sized particles. Ultrasounds may also be used to assist in deagglomeration and putting particles into suspension.

Defects created in particles during the grinding and dispersion steps can also reduce the consolidation temperature, in the same way as when mechanical compressions are performed.

Deposition of Films

According to the invention, the dense thin film is deposited by electrophoresis. The electrophoretic deposition of particles is made by application of an electric field between the substrate on which the deposit is made and the counter electrode, in order to move the charged particles in the colloidal suspension and to deposit them on the substrate. The lack of binders deposited on the surface with the particles can result in very compact deposits. The compactness obtained due to electrophoretic deposition and the lack of any large quantities of organic compounds in the deposit can limit or even prevent risks of crazing or the appearance of other defects in the deposit during drying steps.

Furthermore, due to the fact that the deposit obtained by electrophoresis does not contain any binders or other organic compounds, the process according to the invention does not require any burning or evaporation steps of corrosive or noxious compounds. The increase in economic and environmental constraints makes it necessary to reduce releases into the atmosphere and this invention thus satisfies these constraints.

Furthermore, the deposition rate can be very high depending on the applied electric field and the electrophoretic mobility of particles in suspension. For an applied voltage of 200 V, the deposition rate can be as high as about 10 µm/min.

The inventors have observed that this technique can be used to make deposits on very large areas with excellent uniformity (provided that the particle concentrations and electric fields are uniform over the surface of the substrate). It is also suitable for a continuous band process, in other words the substrate is advantageously a band; the band may be advantageously stationary relative to the liquid phase during the electrophoretic deposition.

The substrate can be a sheet or a band with a sufficiently conducting surface. For example, a copper or aluminum foil with a thickness for example of 20 µm or a polymer band with a an electrically conducting surface deposition, can be used. In the latter case, the fact that thermal consolidation in the process according to the invention takes place at relatively low temperature is particularly interesting.

Figure 2A:
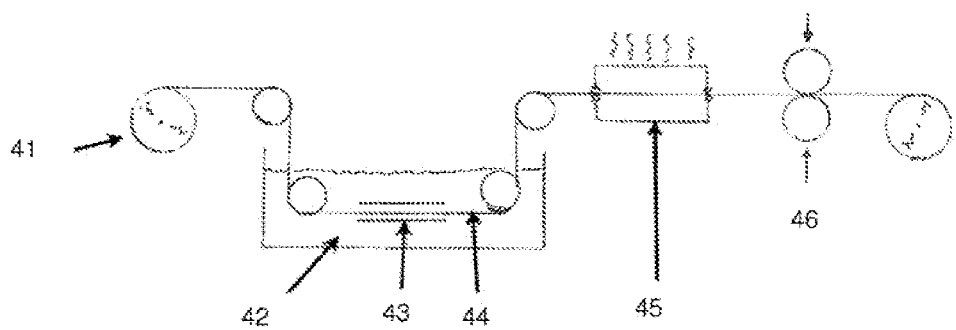
FIGS. 2a and 2b diagrammatically show devices for implementation of the process according to the invention.
Figure 2B:
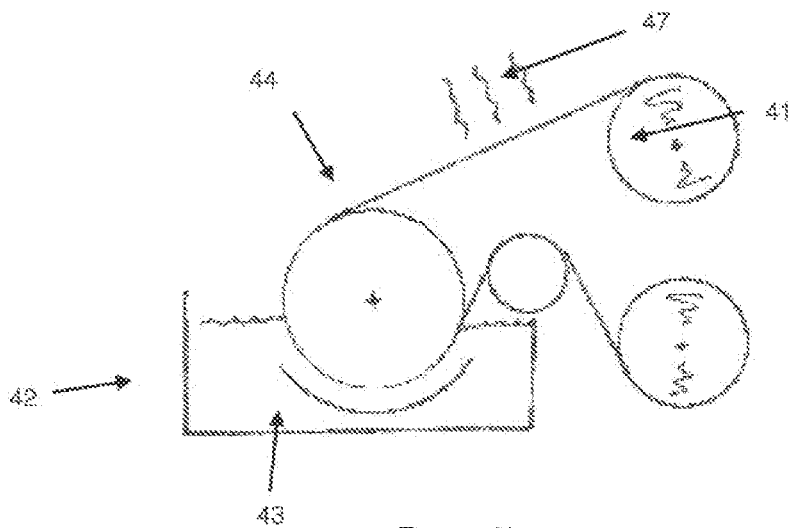

Deposition by electrophoresis may be applied in a "batch" (static) type process or in a continuous process. FIGS. 2a and 2b show different methods of making electrophoretic depositions.

During the electrophoretic deposition, a stabilized power supply can be used to apply a voltage between the conducting substrate and two electrodes located on each side of this substrate. This voltage may be direct or alternating. Precise monitoring of the currents obtained helps to monitor the deposited thicknesses and to control them precisely. When the deposited films are insulating, their thickness affects the value of the electric field and in this case, a controlled current deposition method is preferred. The value of the electric field is modified depending on the resistivity of the interface.

FIG. 2a diagrammatically shows an installation to make use of the process according to the invention. The electrical power supply located between the counter electrodes 43 and the conducting substrate 44 is not shown. An electric field is applied between the two counter electrodes 43 and the substrate 44 to deposit particles of the colloidal suspension 42 on the two faces of the substrate 44.

The reel of electrically conducting foil (band) 44 used as a substrate is unwound from an unwinder 41. After the deposition, the deposited film is dried in a drying furnace 45 and is then consolidated by mechanical compaction using an appropriate compaction means 46. Compaction may be done under a controlled atmosphere and for temperatures between ambient temperature and the melting temperature of the deposited materials.

The view in FIG. 2a is interesting for manufacturing deposits of active materials on current collectors used to make battery electrodes. However, when making multifilm capacitors or photovoltaic cells, it may be more advantageous to coat only one face of the substrate. FIG. 2b thus shows a device for making a coating on a single conducting face without a mechanical consolidation device.

This deposition technique also enables perfect coverage of the surface regardless of its geometry and the presence of roughness defects. Consequently, it can guarantee dielectric properties of the deposit.

The lack of mechanical contacts means that deposits can be made on extremely large areas. With known deposition techniques such as ink printing, it is difficult to guarantee a perfectly uniform thickness over large substrates, which is why the width of coating lines is often limited. For example, when it is required to deposit high power Li-ion battery films, in other words thin deposits, the maximum band width is about 200 to 300 mm, which strongly limits the production capacity of coating lines according to the state of the art.

When materials that do not conduct electricity or conduct electricity only slightly are deposited on the surface of a substrate, any zones that are not so well coated conduct better and thus locally concentrate a higher deposition rate that tends to compensate or even eliminate the defect. The thickness of the film deposited by electrophoresis can vary between a few tens of µm and about a tenth of a µm, bur thicker or thinner films are also possible. However, it is preferred that the electrophoretic deposition obtained in step (c) is less than 10 µm thick and preferably less than 5 µm thick; this is related to the difficulty in compressing a thick film of nanometric powder by mechanical means.

The diagram in FIG. 3 shows a typical embodiment of the process according to the invention:

Step 1: Preparation of suspensions. We use powders with the required chemical composition of the coating (thin film).

Step 2: Immersion of a metal substrate in the colloidal suspension. The colloidal suspension can cover the entire surface of the substrate. In one particular embodiment, an insulating stencil can be applied to the surface of the substrate so as to limit the area in contact with the suspension, consequently reducing the area of the deposit.

Step 3: Application of an electric field between the substrate and the counter electrode located in the colloidal suspension. This electric field can be constant and/or variable (alternating). The average direction of the electric field, in other words the potential applied to the electrodes, is adapted to the charge of the particle to be deposited (cataphoresis or anaphoresis).

Step 4: Drying conditions depend on the deposited thickness and the nature of the solvent.

Step 5: Consolidation of the deposit.

It is possible to perform a mechanical compaction step on the wet film before drying, for example by calendering or static compression; this makes it possible to improve the quality of the film, but does not replace dry consolidation.

Consolidation of the Deposit

In one very advantageous embodiment, the process according to the invention involves mechanical consolidation on a dry film followed by thermal consolidation. This consolidation in two steps minimizes cavities, pores, cracks and other compactness defects. In this very advantageous embodiment, one essential aspect of the process according to the invention is the mechanical consolidation of the dry film. Mechanical compaction of the wet film, known according to the state of the art (see U.S. Pat. No. 7,790,067), gives nanoporous films: it can probably fill in large cavities (and consequently can be usefully added to the process according to this invention as will be described below), but considering the fact that liquid remains trapped between grains forming the powder, it cannot enable efficient deformation of the grains; thus wet compaction gives nanoporous films that are useful as electrodes in DSSC (Dye Sensitized Solar Cells) type solar cells, as disclosed in patent U.S. Pat. No. 7,790, 067 mentioned above, but it cannot be used to obtain dense films with a porosity of less than 20%, and preferably less than 10% like the process according to the invention. The inventors believe, but do not wish to be bound by this theory that explains their observations, that dry consolidation is capable of deforming grains to fill in a large proportion of intergranular pores and to store sufficient energy inside the nanometric grains in the film so that thermal consolidation, which is another essential step in the process according to the invention, enables the formation of a dense thin film at a relatively low temperature.

Thus, a mechanical consolidation step is advantageously carried out after the film has been deposited by electrophoresis and before the consolidation step by heat treatment, which further compacts the particles and induces particle deformations that will facilitate subsequent consolidation even more. A thermal consolidation then has to be carried out.

Mechanical consolidation can be done by any appropriate mechanical means and particularly by compression, calendering, isostatic compression or shock. Thermal consolidation (and in one variant also mechanical consolidation) is preferably done under a controlled atmosphere, in other words under a vacuum or inert gas to prevent oxidation or pollution of the coating; such pollution could be prejudicial to the consolidation mechanism between particles. The heat treatment temperature depends closely on the chemical composition of the deposited powders.

Both treatments can also be carried out at the same time, particularly by heat treatment under pressure.

The mechanical consolidation step can also be carried out after the thermal consolidation step.

In one particular embodiment according to the invention, the pressure applied during the mechanical consolidation step may be comprised between 10 and 100 MPa, preferably between 10 and 50 MPa, and even more preferably between 15 and 35 MPa. The inventors have discovered that for stable nanoparticle suspensions in solution at low concentrations, the mechanical consolidation step may be carried out at low mechanical pressures (a few tens of MPa) to consolidate the film deposited by electrophoresis. The process according to the invention comprising a mechanical consolidation that is carried out before or at the same time as the thermal consolidation, can reduce the heat treatment duration and temperature and limit shrinkage related to these treatments, to obtain a homogeneous nanocrystalline structure. This contributes to obtaining dense and compact films with no defects.

The inventors have observed that the heat treatment temperature can be reduced if the size of the deposited particles is reduced. Thus, thin or relatively thick film deposits can be made with porosity of less than 10%, preferably less than 5% or even 2% without needing to apply high temperatures and/or long heat treatment times.

The inventors believe, although they do not wish to be bound by this theory that explains their observations, that for particle sizes like those used in the process according to the invention, the increase in surface energies becomes the main driving force of consolidation by heat treatment; this results in a large reduction in consolidation temperatures when the particle size reduces. However, if this reduction in consolidation temperatures is to be effective, it is necessary for particles to be firstly mechanically compacted and/or deposited with compact stacking. In this case, multiplication of mechanical contacts between these particles facilitates diffusion processes that cause consolidation. Pressing (calendering) may be used for example, to compact the deposits.

This pressing compaction technique (calendering) is well adapted to deposits composed of micronic or larger particles. Mechanical compaction of nanoparticles is much more difficult than mechanical compaction of micrometric sized particles and requires very high pressures. The number of contacts between particles increases as their size reduces, which results in a friction that dissipates the majority of the compression forces.

The presence of clusters and inter-cluster cavities also has an influence on consolidation. As cavity sizes increase, the diffusion distance also increases and the consolidation temperature necessary to obtain good consolidation increases.

Thus, with nanoparticles deposited by electrophoresis, it is possible to approach the theoretical geometric density of a cubic face-centered stack (68%) or even of a compact hexagonal stack (74%), without a mechanical compaction step.

Such a result is not possible using inking techniques. Deposition of nanoparticles using these techniques is very difficult with thin films because the reduction in particle size increases the viscosity of suspensions. The dry extract then has to be reduced by increasing the proportion of solvent; in this case, it is observed that pores and cavities are induced when much of the solvent is eliminated from the raw films.

The high compactness of the deposit obtained by electrophoresis and the small quantity of solvent to be evaporated very significantly reduce the risk of appearance of cracks after drying. Furthermore, the small size of particles and their large specific area tend to facilitate consolidation steps by heat treatment (often called "sintering" in this context). The deposit can thus be consolidated at temperatures approximately equal to or less than 0.7 $T_f$, preferably not exceeding 0.5 $T_f$ or even 0.3 $T_f$ where $T_f$ is the melting temperature (expressed in ° C.) of the solid material with the lowest melting temperature in the chemical composition identical to that of the deposited particle. The term «melting temperature» as used herein includes the decomposition temperature for substances that have no melting point. An efficient mechanical consolidation can make the deposit even more compact and create isolated defects that will contribute to accelerating the thermal consolidation process at even lower temperatures, to obtain dense thin films with no pores.

Such a process for the fabrication of thin films can be used directly on substrates such as aluminum foils with low melting temperatures, or on metalized polymer sheets.

Since nanoparticles are very sensitive to surface pollution, it is preferable to perform thermal consolidation and possibly also mechanical consolidation under a controlled atmosphere, in other words under a vacuum or an inert atmosphere.

Electrophoresis, preferably done with monodispersed nanoparticles starting from stable colloidal suspensions, can be used to deposit very dense films. Thus, the shrinkage with such a film during thermal consolidation is practically non-existent and therefore these films have few or no defects, even when they are made over large areas and thicknesses. Furthermore, this thermal consolidation step will be done even more easily at low temperatures and during short times if the initial film is compact and was made with small nanoparticles. It is advantageous to use very small nanoparticles (<30 nm) and/or with parallelepiped shapes in order to further increase compactness before thermal consolidation.

Nanoparticle powders with a bi-modal size distribution can also be used, such that the smallest particles fill in the interstices between the largest particles.

The invention has many advantages.

The process according to the invention can be used to make thin films at low temperature. They can cover the edge of any films present on the substrate. Electrophoresis makes it possible to deposit films with compositions that are difficult or even impossible to obtain by a vacuum process; for example, polymers can be added into a mineral phase, or deposits can be made of spinel ($LiMn_2O_4$) or olivine ($LiFePO_4$) type compounds that are difficult to achieve by vacuum deposition.

The process for fabrication of dense thin films by electrophoresis followed by a thermal consolidation at moderate temperature possibly preceded by mechanical consolidation, is simple, fast and inexpensive. The surface on which the deposition takes place can easily be delimited by electrically insulating stencils, and unlike vacuum deposition and inking techniques, there is no deposit on these stencils. In general, the deposition rate is high, and raw materials are used in their entirety. Stencils can be reused without stripping the parasite deposit.

The grain size can be much lower than in films deposited by inks because the film of nanoparticles deposited by electrophoresis is consolidated at low temperature. Since consolidation is done at a relatively low temperature, the films can contain polymers.

The process according to the invention is suitable for fabrication of thin films for use in the electrical, electrotechnical or electronic devices.

For example, it can be used to make Li-ion type batteries. It has two main advantages for this application. Firstly, the process is very much simplified because it does not require use of lithium salts or metallic lithium that are very sensitive to humidity. The batteries obtained also have a high power density when the electrodes are thin; they also have a high energy density (about twice as high as known lithium ion batteries) due to the very low porosity. The lack of corrosive lithium salts extends the life of the battery, reduces the risk of an internal short circuit and also increases its resistance to temperature; consequently, batteries according to the invention can be wave-soldered. Thus, batteries according to the invention have a good safety level. Furthermore, their self-discharge rate is lower because the electrolyte film covers the edges of the electrodes.

EXAMPLES OF SYNTHESIS OF NANOPARTICLES, PUTTING NANOPARTICLES IN SUSPENSION AND PRODUCTION OF DENSE THIN FILMS

1. Synthesis of Nanoparticles a) $LiMn_2O_4$

An $LiMn_2O_4$ powder composed of clusters of nanoparticles is synthesized using Pechini's process described in the article "*Synthesis and Electrochemical Studies of Spinel Phase $LiMn_2O_4$ Cathode Materials Prepared by the Pechini Process*", W. Liu, G. C. Farrington, F. Chaput, B. Dunn, J. Electrochem. Soc., vol. 143, No. 3, 1996. After the calcination step at 600° C., the powder contains clusters with a size of between 50 nm and 100 nm. These nanoparticles can be used to prepare cathode films in Li-ion type batteries.

b) $Li_4Ti_5O_{12}$

An $Li_4Ti_5O_{12}$ powder composed of nanometric sized particle clusters is synthesized using the process described in the article "*Phase-pure nanocrystalline $Li_4Ti_5O_{12}$ for a lithium-ion battery*" by M. Kalbac, M. Zukalova, L. Kavan, J Solid State Electrochem (2003) 8: 2-6. The synthesis is done by mixing a solution of LiOEt at 0.9M and titanium butoxide (IV) in ethanol, under argon. The mixture is made with the stoechiometric ratio of Li/Ti=4:5. The solution obtained is then hydrolyzed with an aqueous solution at 4% of polyethylene glycol. The mixture is then mixed for 11 hours before being evaporated at 40° C. to obtain a viscous paste. An $Li_4Ti_5O_{12}$ powder is obtained after calcination at 500° C. These nanoparticles can be used to prepare anode films in Li-ion type batteries.

c) $Li_{1.3}Al_{0.3}Ti_{1.7}(PO_4)_3$

The first step was to synthesize nanometric powders of $Li_{1.3}Al_{0.3}Ti_{1.7}(PO_4)_3$ using the process described in the "*Thin-film lithium-ion battery derived from $Li_{1.3}Al_{0.3}Ti_{1.7}(PO_4)_3$ sintered pellets*" publication by Xiao and al, published in Trans. Nonferrous Me. Soc. China 16 (2006), p. 281-285. $Li(CH_3-COOO).2H_2O$ and $Al(NO_3)_3.9H_2O$ are dissolved in $CH_3OCH_2CH_2OH$ in stoechiometric quantities, and $PO(OC_4H_9)_4$ is then added to this mixture while stirring. After adding the stoechiometric quantity of demineralized water for hydrolysis of alkoxides, the suspension obtained is dried at 140° C. for 4 hours to form an $Li_{1.3}Al_{0.3}Ti_{1.7}(PO_4)_3$ gel. This gel is then calcinated at 900° C. for 2 hours to obtain an agglomerated powder of $Li_{1.3}Al_{0.3}Ti_{1.7}(PO_4)_3$. These nanoparticles can be used directly to prepare electrolyte films in Li-ion type batteries.

d) $LiMn_{1.5}Ni_{0.4}Cr_{0.1}O_4$

Small quantities of $Li_2CO_3$ powder are dissolved in a mixture of citric acid and ethylene glycol heated to 70° C. A release of $CO_2$ is observed for each added portion. The temperature of the mixture is increased to 90° C., and stoechiometric quantities of $Mn(NO_3)_2.4H_2O$, $Ni(NO_3)_2.6H_2O$ and $Cr(NO_3)_2.9H_2O$ are added to this final solution and the temperature of the mix is then increased to 140° C. to obtain a hard bubbled mass. This mass is then placed in the drying oven at 250° C. until a powder is obtained. The powder obtained is then calcinated at 800° C. for 6 h. The powder obtained can be used to prepare cathode films in Li-ion type batteries.

e) $LiMnPO_4$

An $Li_3PO_4$ powder and an $MnSO_4.4H_2O$ powder are ground in stoechiometric quantities in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

f) $LiFePO_4$

An $Li_3PO_4$ powder and an $FeSO_4.7H_2O$ powder are ground in stoechiometric quantities in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

g) $Li_{2.9}PO_{3.3}N_{0.36}/Li_{2.9}PO_{3.3}N_{0.46}$ (LIPON)

A nanometric $Li_3PO_4$ powder that has not received any high temperature heat treatment is placed in an alumina scoop placed in a tubular furnace. The powder is then heat treated at 650° C. for 2 h under an ammonia atmosphere. The powder thus obtained can be used to prepare electrolyte films in Li-ion type batteries.

2. Deposition of a Dense Thin Film of $LiMn_2O_4$

An $LiMn_2O_4$ powder is put into suspension in ethanol at a concentration equal to 20 g/l.

The suspension is added into the bowl of a ball grinder previously filled with 0.1 mm diameter ceramic balls. Grinding for 2 hours in the presence of polyacrylic acid that acts as a complexing agent results in a colloidal solution with particles with size ($D_{50}$) equal to 30 nm. The zeta potential of the suspension is equal to about 65 mV.

The $LiMn_2O_4$ particles contained in the suspension are then deposited on a substrate composed of a 100 μm thick copper sheet. The deposition is made by applying a voltage of 100 V between the substrate and a counter electrode, both immersed in the colloidal suspension, until a 4 μm thick deposit is obtained. This deposit is then compacted at a pressure of 500 MPa, dried for 1 hour at 90° C. before being consolidated by a 500° C. heat treatment for 1 hour. The porosity of the deposit thus obtained is less than 10%.

This dense thin film can be used as a cathode in a Li-ion battery.

3. Deposition of a Dense Thin Film of $Li_4Ti_5O_{12}$

Method 1: By Making a Colloidal Solution of $Li_4Ti_5O_{12}$ With Added Stabilizer An $Li_4Ti_5O_{12}$ powder is put into suspension in ethanol at a concentration equal to 20 g/l. The suspension is added into the bowl of a ball grinder previously filled with 0.1 mm diameter ceramic balls. Grinding for 3 hours in the presence of a few milliliters of polyacrylic acid that acts as a complexing agent can give a colloidal solution with particles with size ($D_{50}$) equal to about 40 nm. The zeta potential of the suspension is equal to 60 mV.

The $Li_4Ti_5O_{12}$ particles contained in the suspension are then deposited on a substrate composed of a 100 μm thick copper sheet. The deposition is made by applying a voltage of 200 V between the substrate and a counter electrode, both immersed in the colloidal suspension, until a 4 μm thick deposit is obtained. This deposit is then compacted at a pressure of 500 MPa, dried for 1 hour at 90° C. before being consolidated by heat treatment at 450° C. for 2 hours. The porosity of the deposit thus obtained is less than 10%. This dense thin film can be used as an anode in a Li-ion battery.

Method 2: By Making a Colloidal Solution of $Li_4Ti_5O_{12}$ Without Added Stabilizer An $Li_4Ti_5O_{12}$ powder is put into suspension in ethanol at a concentration of about 10 g/l. The suspension is added into the bowl of a ball grinder previously filled with 0.1 mm diameter ceramic balls. After the grinding-dispersion step, the suspension obtained is passed under ultrasound and is then left to settle. The float of the suspension after settlement is drawn off. The size ($D_{50}$) of particles in the colloidal solution is equal to about 58 nm. The zeta potential of the suspension is equal to 30 mV.

The $Li_4Ti_5O_{12}$ electrode was then directly deposited as a thin film by electrophoresis of nanoparticles on an electropolished aluminum foil. Deposition conditions were 10V/cm. The compact deposit obtained is about 0.5 μm thick. The deposition was annealed at 500° C. for 1 hour and then pressed at 50 MPa. FIG. 5 shows the cyclic voltammetry curve at 0.1 V/sec of the electrode thus obtained. This electrode is completely solid and adheres to the substrate without having to add any binders in the deposit.

3—Deposition of a Dense Thin Film of $Li_{1.3}Al_{0.3}Ti_{1.7}(PO_4)_3$ by Making a Colloidal Solution of $Li_{1.3}Al_{0.3}Ti_{1.7}(PO_4)_3$ With Added Stabilizer An $Li_{1.3}Al_{0.3}Ti_{1.7}(PO_4)_3$ powder is put into suspension in ethanol at a concentration of 20 g/l.

The suspension is added into the bowl of a ball grinder previously filled with 0.1 mm diameter ceramic balls. Grinding for 3 hours in the presence of a few milliliters of polyacrylic acid that acts as a complexing agent can be used to obtain a colloidal solution with particles with size $D_{50}$ equal to 15 nm. The zeta potential of the suspension is of the order of 60 mV.

The $Li_{1.3}Al_{0.3}Ti_{1.7}(PO_4)_3$ particles obtained in the suspension are then deposited on a substrate composed of a 100 μm thick copper sheet, applying a voltage of 100 V between the substrate and a counter electrode, both immersed in the colloidal suspension, until a 2 μm thick deposit is obtained. This deposit was then dried for 1 hour at 90° C., and then compacted at a pressure of 400 MPa before being consolidated by a vacuum heat treatment at 300° C. for 30 minutes. The porosity of the deposit thus obtained is less than 10%. This dense thin film can be used as a solid electrolyte in a Li-ion battery.

4—Producing a Colloidal Solution of $Li_{1.3}Al_{0.3}Ti_{1.7}(PO_4)_3$ Without Added Stabilizer An $Li_{1.3}Al_{0.3}Ti_{1.7}(PO_4)_3$ powder is put into suspension in ethanol at a concentration of 10 g/l. The suspension is added into the bowl of a ball grinder previously filled with 0.1 mm diameter ceramic balls. Grinding takes place for 100 minutes and results in a colloidal solution with particles with size $D_{50}$ equal to 30 nm. The absolute value of the zeta potential of the suspension is equal to 40 mV.

What is claimed is:

1. A process for deposition of a dense film having at least one material Px on a substrate, the process comprising:
   providing a colloidal suspension containing nanoparticles of said at least one material Px, wherein the diameter of said nanoparticles of the at least one material Px is less than 100 nm;
   immersing, together with a counter electrode, said substrate in said colloidal suspension;
   applying an electrical voltage between said substrate and said counter electrode to obtain an electrophoretic deposition of a compact film having nanoparticles of said at least one material Px on said substrate;
   drying said compact film;
   mechanically consolidating said dried, compact film; and
   conducting a thermal consolidation of said dried, compact film at a temperature that does not exceed 0.7 times a melting or decomposition temperature of the at least one material Px having the lowest melting temperature of the at least one material Px present,
   wherein, after mechanical consolidation and thermal consolidation, the density of the compact film is 80% of a theoretical density of a solid substance.

2. The process of claim 1, wherein the diameter of said nanoparticles of the at least one material Px is less than one of:
   30 nm; and
   10 nm.

3. The process of claim 1, wherein the thermal consolidation is conducted at a temperature that does not exceed 0.5 times the melting or decomposition temperature.

4. The process of claim 1, wherein the thermal consolidation is conducted at a temperature that does not exceed 0.3 times the melting or decomposition temperature.

5. The process of claim 1, wherein the thermal consolidation is conducted at a temperature of between one of:
   160° C. and 600° C.; and
   160° C. and 400° C.

6. The process of claim 1, wherein the electrophoretic deposit has a thickness that is less than one of:
   10 μm; and
   5 μm.

7. The process of claim 1, wherein said colloidal suspension contains nanoparticles of several different materials.

8. The process of claim 1, wherein said colloidal suspension contains nanoparticles of at least one material Mx.

9. The process of claim 1, wherein said colloidal suspension has a zeta potential of more than one of:
   40 mV expressed in absolute value; and
   60 mV expressed in absolute value.

10. The process of claim 1, wherein said colloidal suspension contains one of a steric stabilizer or a electrostatic stabilizer.

11. The process of claim 1, wherein said colloidal suspension does not contain a steric stabilizer or a electrostatic stabilizer.

12. The process of claim 1, wherein the mechanical consolidation is conducted at pressures between one of:
   10 and 100 MPa;
   10 and 50 MPa; and
   15 and 35 MPa.

13. The process of claim 1, wherein the dense film obtained has a porosity of less than one of:
   20%;
   10%; and
   5%.

14. The process of claim 1, wherein said thermal consolidation is conducted under vacuum.

15. The process of claim 1, wherein the at least one material Px used to prepare cathode films in Li-ion type batteries are chosen from among at least one of the following materials Mx:
   $LiMn_2O_4$, $LiCoO_2$, $LiNiO_2$, $LiMn_{1.5}Ni_{0.5}O_4$, $LiMn_{1.5}Ni_{0.5-x}X_xO_4$ oxides (where x is selected from among Al, Fe, Cr, Co, Rh, Nd, other rare earths, and where $0<x<0.1$), $LiFeO_2$, $LiMn_{1/3}Ni_{1/3}Co_{1/3}O_4$;
   $LiFePO_4$, $LiMnPO_4$, $LiCoPO_4$, $LiNiPO_4$, $Li_3V_2(PO_4)_3$ phosphates; and
   all lithium forms of the following chalcogenides: $V_2O_5$, $V_3O_8$, $TiS_2$, $TiO_yS_z$, $WO_yS_z$, $CuS$, $CuS_2$.

16. The process of claim 1, wherein the at least one material Px to prepare anode films in Li-ion type batteries are chosen from among at least one of the following materials Mx:
   tin oxinitrides ($SnO_xN_y$);
   mixed silicon and tin oxinitrides ($Si_aSn_bO_yN_z$ where $a>0$, $b>0$, $a+b\leq 2$, $0<y\leq 4$, $0<z\leq 3$) (also called SiTON); and oxynitrides in the form $Si_aSn_bC_cO_yN_z$ where $a>0$, $b>0$, $a+b\leq 2$, $0<c-10$, $0<y<24$, $0<z<17$; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, Pb; and
   $SnO_2$, $Li_4Ti_5O_{12}$, $SnB_{0.6}P_{0.4}O_{2.9}$ oxides.

17. The process of claim 1, wherein the at least one material Px used to prepare anode films in Li-ion type batteries comprise $SiSn_{0.87}O_{1.2}N_{1.72}$.

18. The process of claim 1, wherein the at least one material Px used to prepare an electrolyte thin film are chosen from among one or several of the following materials Mx:
   lithium compounds based on lithium and phosphorus oxinitrides (called LiPON) in the form $Li_xPO_yN_z$ where $x\sim2.8$ and $2y+3z\sim7.8$ and $0.16\leq z\leq0.4$, but also all variants in the form $Li_wPO_xN_yS_z$ where $2x+3y+2z=5=w$ and $3.2\leq x\leq3.8$, $0.13\leq y\leq0.4$, $0\leq z\leq0.2$, $2.9\leq w\leq3.3$ or in the form $Li_tP_xAl_yO_uN_vS_w$ where $5x+3y=5$, $2u+3v+2w=5+t$, $2.9\leq t\leq3.3$, $0.94\leq x\leq0.84$, $0.094\leq y\leq0.26$, $3.2\leq u\leq3.8$, $0.13\leq v\leq0.46$, $0\leq w\leq0.2$;
   lithium compounds based on lithium, phosphorus and silicon oxinitrides (called LiSiPON);
   lithium oxinitrides of the LiBON, LiBSO, LiSiPON, LiSON, thio-LiSiCON, LiPONB types (where B, P and S represent boron, phosphorus and sulfur respectively);
   $La_{0.51}Li_{0.34}Ti_{2.94}$, $Li_{3.4}V_{0.4}Ge_{0.6}O_4$, $Li_2O\text{---}Nb_2O_5$, LiAlGaSPO4 compounds; and
   formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where $0<x<1$), $Li_{1+x+y}Al_xTi_{2-x}Si_yP_{3-y}O_{12}$ (where $0\leq x\leq 1$ and $0\leq y\leq 1$), $Li_{1+x+z}M_x(Ge_{1-y}Ti_y)_{2-x}Si_zP_{3-z}O_{12}$ (where $0\leq x\leq 0.8$; $0\leq y\leq 1.0$; $0\leq z\leq 0.6$).

19. The process of claim 1, wherein the at least one material Px used to prepare an electrolyte thin film comprise $Li_{2.9}PO_{3.3}N_{0.46}$ particles.

20. The process of claim 1, wherein the at least one material Px used to prepare an electrolyte thin film comprise $Li_{1.9}Si_{0.28}P_{1.0}O_{1.1}N_{1.0}$ particles.

21. The process of claim 1, wherein the at least one material Px used to prepare an electrolyte thin film comprise formulations based on $4.9Li1\text{-}34,1Li_2O\text{-}61B_2O_3$, $0.30Li_2Si_{0.4}P_{2.6}B_2S_3\text{-}0.44LiI$, $60Li_2S\text{-}40SiS_2$, $0.02Li_3PO_4\text{-}0.98(Li_2S\text{---}SiS_2)$, $2(Li_{1.4}Ti_2Si_{0.4}P_{2.6}O_{12})\text{---}AlPO_4$, and $0,7Li_2S\text{-}0,3P_2S_5$.

22. The process of claim 1, wherein the dense film comprises at least one of dielectric, magnetic, ferroelectric, piezoelectric, optical and electrode films in electronic, electrical and electro-technical devices.

* * * * *